Sept. 2, 1958
W. W. ODELL
2,850,352
BENEFICIATION OF GASES AND VAPORS
Filed Jan. 20, 1955
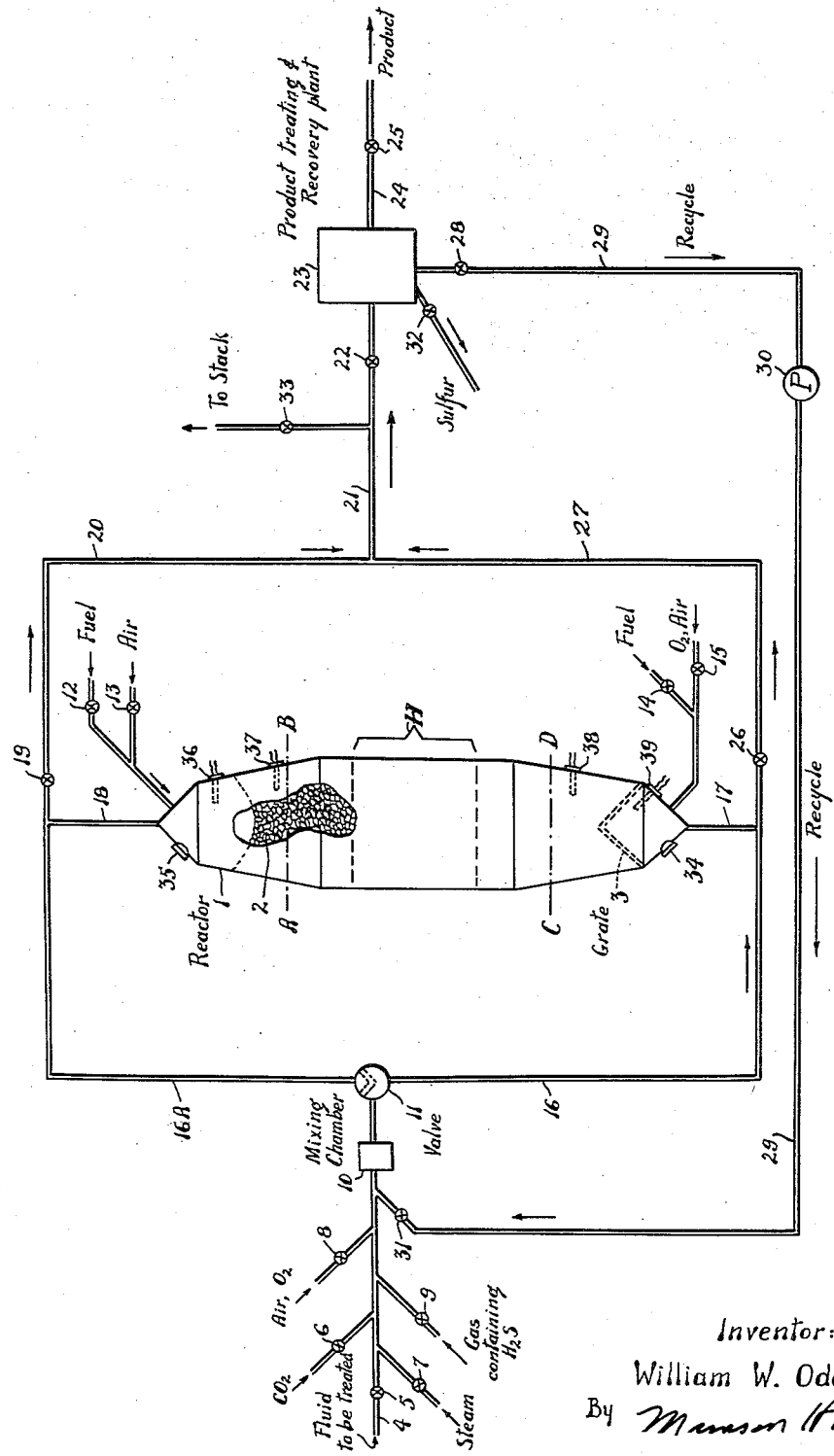
Inventor:
William W. Odell
By Munson Whare
Atty.

2,850,352
BENEFICIATION OF GASES AND VAPORS

William W. Odell, Amherst, Va.

Application January 20, 1955, Serial No. 483,152

8 Claims. (Cl. 23—3)

This invention relates to the beneficiation of gases and vapors. In particular it has to do with a substantially continuous process of improving the chemical characteristics of a gasiform fluid as it passes through and in contact with a pervious deep mass of contact solids while maintaining a hot zone in said mass intermediate top and bottom cooler zones thereof. Still more specifically the invention relates to the alteration of sulfur compounds in a gasiform fluid initially containing one or more of said compounds by thermal and/or chemical reactions promoted in said fluid as it passes rapidly serially through a relatively cool zone, a hot zone and another relatively cool zone in contact with small-size contact solids disposed as a deep continuous bed in a reaction chamber.

This invention is a continuation in part of my application Serial No. 670,409, filed May 17, 1946, subsequently refiled as a continuation application Serial No. 266,614 on January 16, 1952, now Patent No. 2,700,600, dated January 25, 1955, and Serial No. 266,738, also filed January 16, 1952, for treating gases, now Patent No. 2,731,335, dated January 17, 1956. The present application relates in particular to the alteration of sulfur compounds initially present in a gaseous fluid, commonly as an impurity in small percentage amounts.

One of the objects of this invention is to alter the chemical composition of sulfur impurities in combustible or other gasiform or vaporous fluids through contact with hot solids under such conditions that the fluid reaction products are immediately cooled upon leaving contact with said hot solids, whereby high-temperature equilibrium is largely preserved and reverse reactions are not promoted.

Another object is the production and recovery of elemental sulfur from gasiform fluids initially containing convertible sulfur compounds. Still another object is the purification of impure gasiform fluids or vaporous fluids by conversion of the impurities by chemical reaction in the presence of an oxidizing fluid at elevated temperature by passing a stream initially containing said impurities longitudinally through an elongated mass of small-size solids having a heated portion intermediate the cooler ends thereof, whereby reaction products, formed in the hot zone are so rapidly cooled in a downstream cooler and zone, that they are not appreciably further reacted in the reactor. Manufactured gases such as oil gas, carburetted water gas, synthesis gas containing organic and/or inorganic sulfur compounds are examples of gases adapted for treatment.

Other objects will become apparent from the disclosures hereinafter made.

In the manufacture of ordinary water gas, for example, the major components are hydrogen and carbon monoxide in the respective amounts of about fifty and forty percent. However, besides these components there are present, usually, small amounts of impurities such as $H_2S$, $CS_2$, thiophene, mercaptans, organic sulphides, hydrogen cyanide, olefins, diolefins, methane and other undesired materials. In present practice the $H_2S$ is largely removed by absorption in water, an alkaline solution, or by reaction with iron oxide. Organic sulfur is largely removed in common practice by absorption in active carbon or oil washing. One known procedure for removing organic sulfur is by contacting the gas with a catalyst comprising thirty percent sodium carbonate and approximately seventy percent iron oxide; the reaction being conducted at about 180° to 200° C. In the latter operation the sodium carbonate is converted to sulphate and then new catalyst is required. So far as the inventor is aware a truly satisfactory procedure for reacting sulfur-compounds and the gum-forming components has not heretofore been provided. In the practice of this invention an economical procedure is provided in which catalyst need not be thus consumed and one which does not require separate heat exchangers to economize the sensible heat of the exit gas. For highest degree of purification and conversion it is usually preferable in the practice of this invention that the gas treated be first subjected to a rough or so-called "coarse" purification for the removal of the major portion of the $H_2S$, particularly if the gas to be treated initially contains large amounts of it.

This invention is particularly applicable to the treatment of gases at high temperatures preferably in the presence of steam or other endothermic oxidant and a relatively small amount of oxygen, whereby the desired conversion or decomposition of impurities is accomplished.

One form of apparatus in which this invention may be practiced is shown diagrammatically, in elevation in the figure which in essence is a flow diagram.

In the figure the reactor 1 confines a deep bed of small-size solids 2 supported on grate 3. Reactant fluids to be introduced into the reactor 1 are supplied through conduit 4 and valves 5, 6, 7, 8 and 9, whereas recycle gas is supplied through valve 31. The fluids chosen, and passing through conduit 4, are mixed in mixing chamber 10 and pass through the control valve 11. During one period of operation the fluid stream from 11 passes through conduits 16 and 17 to the bottom of the reactor 1 and thence up through grate 3, bed 2, and out through valve 19, conduits 20 and 21, and valve 22 to product-treating plant 23. The products not extracted in the latter plant exit through pipe 24 and valve 25 except the portion which is used for recycle, which passes through valve 28, conduit 29, pump 30 and valve 31. Fuel may be supplied to the top and bottom of the bed respectively through valves 12 and 14, and combustion supporting fluid may be introduced through 13 from above and through 15 from beneath the bed. The hot zone shown at H travels alternately upwardly and downwardly during operation, having a top during upward blasting of the reactants at about AB below the top level of bed 2, and having a bottom above the grate at about CD at the end of the down blast period of operation. Gasiform or vaporous hydrocarbon substance, combustible gas or other fluid containing sulfurous impurities are admitted through valve 5. The fluids admitted through valves 6, 7, 8 and 9 are, respectively, $CO_2$, steam, air or oxygen, and gas containing $H_2S$. Sulfur is removed from treating plant 23 through valve 32. During the down-blast period valve 11 is so positioned that the fluid stream passing therethrough passes serially through 16-A, 18, bed 2, 3, 17, 26, 27, 21, 22, 23, 24 and 25. The recycle gas travels, as with up-blasts, from 23 through 28, 29, pump 30 and valve 31. The stack gas formed during the initial heating period exists through valve 33. One method of igniting the fuel burned in the reactor during the heating up period is by inserting burning combustible matter through ignition doors 35 or 34, according as the initial blasting is down or up through the bed. The temperatures of different zones in the reactor are determined by the use of thermocouples 36, 37, 38 and 39 which are suitably connected for temperature recording.

EXAMPLE I

Conversion of organic sulfur initially present in a synthesis gas comprising essentially CO and $H_2$.

Before treating the synthesis gas a hot zone is established in bed 2 either as shown in the parent cases or as follows: A gasiform fuel and air for its combustion are admitted at one end of the reactor, say through 12 and 13, respectively, and the fuel is ignited as through ignition door 35. The products of combustion are passed down through bed 2, exiting at the bottom of reactor 1, and are passed through 17, valve 26, conduits 27 and 21 and out through valve 33 to the stack. This heating operation is conducted until an appreciable layer of the solids three to six feet in bed 2 adjacent the top are heated to a temperature of about 1600° to 1800° F. During this heating operation it is desirable to increase the amount of air progressively, using an excess of air, in order to avoid overheating the top layer of solids. Now the fuel valve 12 is closed and air blasting is continued for a short period, which causes the hot zone to travel downwardly below about AB. Now the air valve 13 is closed and the bed is in condition for the gas-treating operation to begin. The synthesis gas is supplied through line 4 and valve 5 and a small relative amount of oxygen, in this example 1.2 per cent by volume of the synthesis gas fed to the reactor, is introduced through valve 8. The combined stream along with steam admitted through valve 7 is mixed in mixing box 10 and passes through valve 11, conduits 16–A and 18, and down through bed 2, passing first through the relatively cool top zone, becoming preheated, and then passing through the incandescent hot zone and immediately through the relatively cool bottom zone. The thus treated gas passes out of reactor 1 through conduit 17, valve 26, conduits 21, 27 and valve 22, plant 23 and finally through 24 and valve 25. The operating data are:

Organic sulfur in synthesis feed____gr. per 100 ft__ 12
Temperature of synthesis gas fed to 1_____° F__ 300
Temperature of oxygen supplied_____° F__ 220
Pressure in the reactor_____lbs. gage__ 60
Rate of feed of synthesis gas to reactor based on normal temperature and pressure is 5 cu. ft. per sq. ft. area of reactor (through AB) per second.
Oxygen used, 1.2% of the synthesis gas.
Steam used, approximately 5 lbs. per M. c. f. of synthesis gas (100 cu. ft.).

Down blasting is continued until the bottom of the hot zone has moved down to CD and the temperature of the gas discharged through 17 is 300° to 400° F. Thermocouples 38 and 39 are helpful in determining the change point. The valve 11 is now turned, valve 26 is closed and valve 19 is opened and an up-blast run is promoted in a like manner as the down blast, until the temperature of the exiting gas is 300° to 400° F. and then the cycles are repeated. The heat liberated by the oxidation of organic sulfur and other combustible gases initially present in the reactant mixture is sufficient to offset the radiant heat losses inherent in the process. The temperature of the gas stream exiting from either end can be limited to substantially that of the feed stream so that the heat loss is very small and is almost entirely radiant heat from the hot zone. The amount of organic sulfur in the exit gas is a faint trace. The size of the solids used in bed 2 is about one inch mean diameter in this example.

The process is continuous but the operation is cyclic as to change of direction of flow of fluids through the reactor. The solids of bed 2 are $Al_2O_3$ in the foregoing example but may be $SiO_2$, or $Cr_2O_3$, silicious pebbles, or manufactured refractory solids. The amount of oxygen used is always such that the temperature is maintained at the chosen degree in the hot zone. Under some conditions, depending on the nature of the hot zone (depth) and the kind of organic sulfur compounds present, lower temperatures than given in the foregoing example may be employed. This can be determined by test.

EXAMPLE II

Removal of organic sulfur, gum-forming diolefins and reduction of methane content of water gas made from coal, coke and the like, composed chiefly of $H_2$ and CO but containing approximately 1.8 per cent of $CH_4$ and 0.2 per cent of illuminants which latter includes the gum-forming constituents, and 8 grains per 100 cubic feet of organic sulfur compounds.

Chamber 1 is filled with carefully selected solids, preferably about one inch mean diameter in large reaction chambers and preferably spherical, which may be chiefly $SiO_2$, $Al_2O_3$, $Cr_2O_3$ or other highly refractory material. The size of the solids should preferably be appreciably smaller than one inch mean diameter in small size reactors. Combustible fuel gas (the water gas to be treated is satisfactory) is caused to flow through 4 by opening valve 5, and an excess of air for its combustion is admitted by opening valve 8. Valve 11 is so opened that the gas flows through 4, 10 and 11 and conduit 16–A to the top of 1, where it is burned with air. The mixture is thus burned in 1 after it is ignited, as through ignition port 35. Combustion is continued and the air and gas ratios varied so that an appreciable thickness of bed 2 is heated to 1800° to 2300° F., meanwhile removing the products of combustion through 17, 26, 27, 21 and 33, valves 19 and 22 being closed. The gas valve 5 is now closed and a straight air blast is made, removing the air similarly through 17, 26, 21 and 33. The solids in the lowest zone of 1 will now be at about atmospheric temperature, a higher zone is now the hot zone in which the solids are heated to 1800° to about 2300° F., and the top-zone solids are at substantially 300° to 400° F. The apparatus of the figure is now ready for regular operation. Valve 22 is now opened and valve 33 is closed. Water gas is admitted by opening valve 5; steam is introduced by opening valve 7, and a very small amount of oxygen or air is admitted by opening valve 8. The selection of $O_2$ or air is made chiefly in accordance with the requirements or limitations as to nitrogen content of the finished gas. If oxygen is used the amount, which may vary with different kinds of water gas from 0.2 to 5 per cent or more, should be, in this example case, about 1.0 per cent. The resulting gaseous products pass out at the bottom of 1, through 17, 26, 27, 21 and valve 22 to the gas handling system 23. This is continued until the temperature of the gas stream leaving the bottom of the reaction chamber 1 reaches approximately 300° to 400° F. The operation is continued but the direction of flow of fluids through 1 is now reversed, by reversing valve 11 and substantially simultaneously closing valve 26 and opening valve 19. The course of the gas stream from valve 11 is now through 16, 17, bed 2, 18, valve 19, lines 20 and 21 and valve 22 to the treating plant 23. When the temperature of the outlet gas from 1 reaches about 300° to 400° F. another reversal of flow through reaction chamber 1 is initiated. The process is continuous and the temperature is self-sustaining and the heat wave or hot zone travels alternately upwardly and downwardly through the bed of solid 2. It may be desirable at infrequent time intervals (periodically) to make a prolonged air blast to the stack by closing valve 22 and opening valves 8 and 33, allowing the outlet blast gas temperature to rise above said 300° to 400° F. and admitting a small amount of gas through 4, 5, 10, 11, 16 and 17 during a late stage of the air blast period. The gas-air mixture at this stage may be one volume of gas and fifteen to twenty volumes of air.

During the regular gas-treating operation the proportions of $O_2$, gas and steam used in this example are:

| | Cubic feet |
|---|---|
| Water gas | 1000 |
| Steam | 100 |
| Oxygen | 12 |

The pressure in the reaction chamber and system may be substantially atmospheric pressure or 10 to 20 atmospheres or more may prevail. One of the advantages of the use of superatmospheric pressure is that smaller equipment and lower linear velocities through the contact solids may be employed. Somewhat more steam is desired when operating under superatmospheric pressure than at atmospheric pressure, particularly when the feed gas contains hydrocarbons, to prevent carbon formation, although 200 cubic feet of steam per 1000 cubic feet of water gas is usually ample even at 20 atmospheres pressure. There is no apparent advantage in appreciably preheating the gas or oxygen but the steam used should be at such a temperature relative to the oxygen and water gas that condensation of water vapor does not occur in the inlet conduits to the reaction chamber; the steam-gas mixture may enter the reaction chamber somewhat below 200° F. The linear velocity of the fluid stream into the bed of solids in the reaction chamber, calculated as at 60° F., may be of the order of 100 to 500 cubic feet per minute per square foot of equivalent grate area, namely per square foot of internal horizontal sectional area of said chamber.

The size of the solids used should be selected in accordance with the diameter of the reaction chamber. A size of about 0.75 to 1.5 inches mean diameter is satisfactory for large chambers having an internal diameter of 8 to 10 feet, whereas with chambers 4 to 5 feet internal diameter the size solids preferred is 0.6 to 1.2 inch. Although the solids should be as uniform in size as possible in order to minimize the "wall effect" and to minimize the necessity of periodically driving the heat to substantially one end of the reaction chamber, it is decidedly advantageous to employ metal spheres or the like at the top and bottom layers and these can be smaller than the other solids. The metal being a better conductor of heat than the oridinary refractory solids is perhaps an explanation of the leveling out effect of the metal solids on the temperature in the end zones. The temperature zones should be horizontal layers; the use of metal in the top and bottom layers is helpful in maintaining this condition.

The results obtained in this Example II are indicated by gas analyses as follows:

*Composition of the moisture free gases*

| | Inlet water gas | Outlet treated gas |
|---|---|---|
| $CO_2$ | 4.0 | 3.9 |
| Illuminants | 0.2 | 0.0 |
| $O_2$ | 0.0 | 0.0 |
| $CO$ | 40.6 | 41.0 |
| $H_2$ | 49.8 | 51.5 |
| $CH_4$ | 1.8 | 0.1 |
| $N_2$ | 3.6 | 3.5 |
| | 100.0 | 100.0 |
| Organic sulfur, grains per 100 cubic feet | .8 | Trace |

The gum forming hydrocarbons which were present in the raw water gas were entirely eliminated and the volume of combustible gas was increased 4 percent. Apparently oxidation and re-forming reactions occur in the reaction chamber in a very efficient manner. Some of these reactions which can occur are:

(1) $CH_4 + 2O_2 = CO_2 + 2H_2O$
(2) $CH_4 + \frac{1}{2}O_2 = CO + 2H_2$
(3) $CH_4 + H_2O = CO + 3H_2$
(4) $CH_4 + 2H_2O = CO_2 + 4H_2$
(5) $CH_4 + CO_2 = 2CO + 2H_2$
(6) $CS_2 + 2H_2O = 2H_2S + CO_2$
(7) $CS_2 + 3O_2 = CO_2 + 2SO_2$
(8) $COS + H_2 = H_2S + CO$
(9) $2H_2S \text{ plus heat} = 2H_2 + S_2$
(10) $2NO + 2H_2 = 2H_2O + N_2$
(11) $C_2H_4 + 3O_2 = 2CO_2 + 2H_2O$
(12) $C_2H_4 + O_2 = 2CO + 2H_2$
(13) $C_2H_4 + 2H_2O = 2CO + 4H_2$ Diolefins polymerize, split, oxidize and also react with hydrogen to form saturated hydrocarbons which in turn are re-formed by reaction with steam to form CO and $H_2$ or with $O_2$ to form CO and $H_2$. Likewise reaction 6 proceeds at quite low temperatures. Thus small amounts of hydrocarbons may be eliminated and the total volume of $CO + H_2$ increased simultaneously with the elimination of nitrogen oxides and gum-forming substances.

The invention is not limited as to the velocity of flow of fluids through the bed of solids. However, the time of contact of the fluids with the hot solids will vary according to the temperature of the solids and the nature of the gas being treated. Experiments with a given gas at a chosen temperature will establish a possible limit.

Equations 6 and 8 are for endothermic reactions and are favored by high temperatures, whereas the reaction of Equation 7 is highly exothermic and usually occurs before the zone of maximum temperature is reached because of the low ignition temperature of $CS_2$.

The temperatures given in the example are those found to be satisfactory without the use of catalyst solids. Oxidation catalyst can be used at lower temperatures, particularly with some gases. Thiophene and some gum formers are best destroyed by high temperature treatment as described.

Coal gas or mixtures of water gas and coal gas may be similarly treated and the sulfur compounds therein converted.

It will be noted that the stream initially containing the reactant fluid, in passing through the bed of prepared small size solids, as in reaction chamber 1 of the figure, first contacts relatively cool solids and as its travel continues its temperature is raised, layer by layer, to the maximum temperature in the hot zone of said bed and is then similarly cooled to a similar lower temperature. As the stream temperature rises in its travel through the bed it reaches a temperature where reactions such as shown in Equations 6, 7 and 8 occur at a much faster rate than the steam hydrocarbon reactions, and this is a very desirable condition; the hydrocarbon endothermic reactions proceed rapidly only at higher temperatures, above about 1650° F. without a catalyst. Therefore, in promoting chemical reactions in a gas stream by this invention the oxidation of the hydrocarbons by oxygen is initiated before the oxidation of hydrocarbons by $CO_2$ or steam. Heat is thus provided to maintain the desired temperature of the intermediate hot zone of the bed.

In most processes, so far as I am aware, the substitution of $CO_2$ for steam as a reactant for hydrocarbon conversion is not particularly advantageous since the heat required is substantially the same in each case, i. e., Equations 3 and 5. However, in this invention, and in the preparation of a synthesis gas for example, $CO_2$ is usually washed out of the raw gas made and is discarded. Its use in this invention is indicated to the extent it is available and to the limit placed by any particular ratio of $H_2$ to CO in the synthesis gas. Lower reactor inlet and outlet temperatures can be used in this invention when $CO_2$ is employed replacing an equivalent of steam. They may be as low as 60° to 100° F.; condensation is not then a factor.

A catalyst may be used in any portion of the bed or the bed may be comprised substantially entirely of catalyst material. It should be selected in accordance with the sulfur content and other properties of the gas to be treated.

Although any operable temperature above about 1650° F. to 1850° F. usually may be employed, a range found to be satisfactory and sometimes preferred is above about 1800° F. and not appreciably above 2300° F. when the preservation of hydrocarbons is not essential. A catalyst is not required at the latter temperatures.

It is understood that applicant does not desire to limit this invention to the treatment of gases containing very small amounts of impurities and hydrocarbons; it can be used successfully with gases containing very large amounts of such materials or containing substantially large amounts of vaporous or of vapor phase hydrocarbon.

A lower temperature than 1800° F., say 1200° to 1600° F. is advantageously employed, for example, when treating oil-gas having an appreciable content of olefins (10 to about 25%) with some diolefins, organic sulfur and other impurities in lesser amounts. In this instance the steam employed functions to preserve the more stable hydrocarbons, such as methane, ethane, propane, ethylene, benzene and the like, in this temperature range, while the less stable $CS_2$, diolefins and high-molecular-weight hydrocarbons are readily converted. The $CS_2$ having a low ignition temperature is usually oxidized before other reactions are completed, by such reactions as indicated by Equations 6 and 7. It will be noted that $SO_2$ reacts with $2H_2S$ to form sulfur and water vapor by an exothermic reaction; this reaction is not favored by extremely high temperatures or by the presence of steam, hence the $SO_2$ formed in this process at reaction temperatures below 1600° F. in the presence of added steam does not immediately react with $H_2S$ forming free sulfur. The latter reaction occurs after the stream of reactants has cooled, usually after the stream of reaction products exits from the reactor; the sulfur is recovered by known means from the exit gas stream in the product treating plant.

EXAMPLE III

Converting $H_2S$, commonly present in the effluent fluid streams from a gas-purification-plant regenerating system, and producing sulfur.

The basic reaction is typified by Equation 14 as follows:

(14) 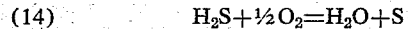 $H_2S + \frac{1}{2}O_2 = H_2O + S$

This is a highly exothermic reaction. The gas treated in this example has a composition (dry basis) as follows:

| | Percent |
|---|---|
| $CO_2$ | 95 |
| $H_2S$ | 5 |
| | 100 |

The gas is mixed with 25.0 cubic feet of oxygen as air (120 feet) per 1000 cubic feet, and with 2 lbs. of steam and pased through the reactor as a stream. Referring to the figure operation is as follows: A hot zone H is established in bed 2 as described with a temperature of about 1350° F. The gas to be treated enters the system from 4 by opening valve 5; the oxygen (air) and steam are introduced by opening valves 8 and 7 respectively. The stream of the mixture pases through 10 and 11, and then alternately down for a period and then up for a period, passing through and in contact with the mass of hot solids in zone H during each run. The product gas passing on through line 21 and valve 22 to the treating plant 23 in each case, and the sulfur formed during processing in the reactor is removed from the stream of reaction products in the latter plant by known methods and is discharged through valve 32. In this example a little more heat is released in the reactor by the oxidation of the $H_2S$ to S and $H_2O$ than is required to maintain the chosen temperature of 1350° F. in the hot zone. Under these conditions it is expedient to introduce the mixture at as low a temperature as feasible and to allow each run (up and down) to continue until the temperature of the gas stream exiting through 18 and 17 respectively is at a temperature about 300° F. higher than the feed-mixture temperature. Operating data are substantially as follows:

Temperature of the feed mixture _____ F° __ 100
Final temperature of the exit gas as indicated by thermocouples 36 and 39 _____ F° __ 400
Relative proportions of reactants in the mixture supplied to reactor 1 are:
    Gas containing $H_2S$ _____ cubic feet __ 1000
    Air _____ do ____ 120
    Steam _____ pounds __ 2
Pressure in system, slightly above atmospheric.
Rate of feed of mixture to reactor, cubic feet per second per square foot area of section of 1 through AB or CD _____ 2
All of the $H_2S$ of the feed gas is reacted.

Under the chosen hot zone temperature it is quite necessary to dissipate heat, as noted above, in order to maintain satisfactory operating conditions. Operating as in this Example III the sulfur formed is carried out of the reactor in the vapor phase in the stream conveying reaction products. Treating gases containing a greater percentage amount of $H_2S$ it usually is necessary to dissipate more heat, such as by allowing exit gas temperatures to rise above the 400° F. given in this example. At higher temperatures in the hot zone and when hydrocarbons are present in the gas to be treated there is less tendency for the temperature in the hot zone to rise because of offsetting endothermic reactions of steam and/or $CO_2$ with the hydrocarbons. When the $H_2S$ content of the feed gas is higher than can conveniently be converted in the reactor with satisfactory temperature control the spent gas (residue after the extraction of sulfur in the product treating plant 23) is recirculated back to the reactor in amounts required. The recycle gas thus returned is conducted from 23 through valve 28, conduit 29 and pump 30 to mixing chamber 10. By the use of recycle gas the maximum temperature of discharge of fluid from the reactor can be kept with due bounds. It is necessary, of course, to keep in mind the vapor pressure of sulfur and the concentration in the gas exiting from the reactor. To maintain the sulfur in the vapor phase the outgoing gas temperature must be such that the sulfur is in this phase; dilution with recycle gas is an excellent control measure.

EXAMPLE IV

Conversion of sulfur compounds initially present in oil gas which gas has a high thermal (calorific) value.

Referring to the figure, a hot zone is established at H of the figure, having a temperature of 1350° to 1500° F. in a manner substantially as described. The gas to be treated in this example as a composition substantially as follows:

| | Vol. percent |
|---|---|
| Carbon dioxide | 2.0 |
| Carbon monoxide | 1.4 |
| Hydrogen | 26.1 |
| Ethylene | 22.1 |
| Methane | 36.8 |
| Ethane | 5.1 |
| Propane | 1.0 |
| Propylene | 3.4 |
| Butane | 0.3 |
| Butylene | 0.1 |
| Butadiene | 0.9 |

| | |
|---|---|
| Cyclopentadiene | 0.3 |
| Acetylene | 0.2 |
| Nitrogen | 0.3 |
| | 100.0 |
| Organic sulfur, grains per 100 cu. ft. | 54 |
| B. t. u. per cubic foot | 1056 |

The gas of given composition is introduced from line 4 by opening valve 5 and the oxygen and steam are supplied by opening valves 8 and 7. The amounts of oxygen and steam supplied per 1000 cubic feet of the oil gas are, respectively, 17 cubic feet and about 3 pounds. The superficial velocity of the stream in the reactor is high, being of the order of 5 to 10 feet per second. It is found that as the temperature rises appreciably above 1400° F. increasing amounts of hydrocarbons are converted, by reaction with steam to CO, $CO_2$ and $H_2$ by endothermic reactions, and this feature is helpful in maintaining the desired temperature in the hot zone. More oxygen is required at higher temperatures than about 1400° F. and at low rates of fluid flow through the reactor, in order to maintain the temperature in the hot zone, when hydrocarbons are present in appreciable amounts in the fluid under treatment.

The composition of the treated oil gas in this Example IV is as follows:

| | Vol. percent |
|---|---|
| Carbon dioxide | 5.7 |
| Carbon monoxide | 3.7 |
| Hydrogen | 26.8 |
| Ethylene | 24.0 |
| Methane | 34.9 |
| Ethane | 1.8 |
| Propane | 0.4 |
| Propylene | 1.8 |
| Butane | 0.6 |
| Butylene | 0.0 |
| Nitrogen | 0.3 |
| | 100.0 |
| Cubic feet from 1 M. c. f. of oil gas | 1111 |
| B. t. u. per cubic foot | 940 |
| Organic sulfur | None |

Somewhat summarily it may be said that the nature of the refractory solids and their size are chosen to suit conditions. They should be substantially non-reactive with sulfur, of high melting point and resistant to spalling.

Temperatures in the hot zone and the depth of the hot zone are chosen with reference to the nature and properties of the fluid treated, so as to avoid undesirable side reactions. Water gas and the like can be treated at high temperatures with a deep hot bed 5 to 8 feet or more and, when desired, a low flow rate can be safely employed, but when treating a gas or vapor containing hydrocarbons which are desirable in the finished product it is advisable to employ high flow rates and a relatively thin hot zone. The amount of oxygen used is sufficient to maintain the temperature in the hot zone and to oxidize the organic sulfur initially present in the fluid under treatment. Very little oxygen is required ordinarily.

Referring again to Equations 6 and 7, column 6, it will be noted that the oxidation of $CS_2$ to $H_2S$ and $CO_2$ is endothermic and is favored by excess steam and high temperatures, whereas the reaction typified by Equation 7 is highly exothermic and occurs at low temperatures. In promoting both of these reactions together it is possible to so adjust the relative amounts of steam and oxygen so that the $H_2S$ and $SO_2$ formed are in the approximate proportion whereby the reaction to form elemental sulfur, as indicated in Equation 14, may occur, namely 2 vols. of $H_2S$ to 1 vol. of $SO_2$. These substances in the fluid discharged from the reactor are then, at a lower temperature than that of the hot zone, allowed to react with the formation of sulfur which is recovered.

For a wide range of fluids to be treated the bed depth in the hot zone (the thickness of the hot zone) is within the limits 2 to 8 feet although the invention is not thus limited. Because the rate of cracking of hydrocarbons increases rapidly with increase in temperature it is important when treating hydrocarbon vapors and/or gases to coordinate the temperature and duration of contact with the hot solids. A shorter time of contact is usually required at the higher temperatures and to bring about this condition a thinner hot zone may be used or a higher superficial stream velocity may be employed, or both may be used. Additional steam dilution is also helpful until a temperature is reached where an excessive amount of steam-hydrocarbon reaction occurs. It is understood that superatmospheric pressures may be employed in promoting reaction in the reactor. The temperature of the feed stream to the reactor is a governing factor as to a limiting pressure; that is, the pressure must not be so high that one or more components of the feed stream condenses in the reactor inlets. Again, when air is used as the combustion supporting fluid it must be compressed to the chosen pressure as must also the fluid to be treated. Pressures up to about 500 pounds are in general satisfactory.

Having described my invention so that one skilled in the art can practice it without limitation to the specific examples and shape of apparatus, I claim:

1. A process of beneficiating a fluid selected from the class consisting of combustible gases and vapors initially of low carbon dioxide content which contain small amounts only of readily oxidizable sulfurous compounds and altering the chemical nature of said compounds at elevated temperatures, comprising, passing a stream initially comprised of such a fluid, containing gasiform combustible matter, with a relatively small amount of free oxygen, and an oxidizing substance, selected from the class consisting of steam and $CO_2$, substantially longitudinally through a confined, continuous, elongated mass of small-size refractory solids while said solids are at an elevated reaction temperature below 2300° F. in a hot zone thereof intermediate much cooler end zones, whereby said stream is preheated in the inlet end zone, heated to reaction temperature in said hot zone and immediately quickly cooled to a much lower temperature in the exit end zone of said mass, thereby altering the chemical composition of said compounds in said stream by oxidation in contact with the hot solids, meanwhile maintaining the said reaction temperature in said hot zone by burning some of said combustible matter initially present in said stream with the said free oxygen, and recovering the cooled, beneficiated fluid exiting from the exit end zone of said mass as combustible gas.

2. A process of beneficiating a fluid selected from the class consisting of combustible gases and vapors initially of low carbon dioxide content which contain small amounts only of readily oxidizable sulfurous compounds, and altering the composition of said compounds, comprising, passing a stream, initially comprising such a fluid containing combustible matter, a small amount of a combustion supporting gas and a small percentage amount of an oxidizing medium selected from the group consisting of $CO_2$ and steam, in cycles upwardly and downwardly completely through an upright, confined, continuous, deep bed of small-size refractory solids, which bed has a hot zone intermediate the relatively cool top and bottom zones thereof at a reaction temperature of the order of 1250° to 1800° F., thereby causing said stream to be preheated in the inlet end of said bed, to be heated to reaction temperature in said hot zone for a period sufficient to alter the composition of said sulfurous compounds, and to be immediately quickly cooled to a much lower temperature in the exit end zone of said bed, meanwhile maintaining the said temperature in said hot zone by promoting the combustion of combustible matter initially present in said stream with said combustion supporting gas, and recovering the cooled, beneficiated fluid exiting from the exit end zone of said mass as combustible gas.

3. The process defined in claim 2, in which the depth of the hot zone is maintained at 2 to 8 feet.

4. The process defined in claim 2, in which the sulfurous compounds are oxidized at least in part to free sulfur and in which the sulfur is removed from said mass in the vapor phase in said stream and recovered.

5. The process defined in claim 2, in which some of the product gas freed of elemental sulfur is recycled to the mass along with said stream as a method of controlling the temperature in the hot zone, preventing overheating.

6. The process defined in claim 2, in which the said stream initially also contains hydrocarbon substance and in which endothermic reactions of some of said substance with an oxidizing medium is promoted as a means of preventing overheating of the hot zone.

7. The process defined in claim 2, in which the stream initially containing sulfurous gases to be reacted is treated in the mass of solids while under pressures of 1 to 500 pounds per square inch.

8. A process of beneficiating a fluid selected from the class consisting of combustible gases and vapors initially of low carbon dioxide content which contain small amounts only of readily oxidizable sulfurous compounds at elevated temperatures, comprising, mixing such a gas with steam and with a gas containing free oxygen, passing the mixture as a stream alternately upwardly and downwardly completely through an upright, confined, deep, continuous bed of small-size refractory solids, which bed has a hot zone, intermediate top and bottom relatively cool end zones, at a temperature of the order of 1250° F. to 2300° F., thereby causing said stream to be preheated in the inlet end zone of said bed, to be heated to reaction temperature in said hot zone for a period sufficient to alter the composition of said sulfurous compounds in said stream by incomplete oxidation thereof, and to be immediately quickly cooled to a much lower temperature in the exit end zone of said bed, meanwhile maintaining the said temperature in said hot zone by promoting the combustion therein of combustible matter initially present in said stream with said free oxygen, and recovering the cooled, beneficiated fluid exiting from the exit end zone of said mass as combustible gas.

References Cited in the file of this patent

UNITED STATES PATENTS

| | | |
|---|---|---|
| 1,941,702 | Maier | Jan. 2, 1934 |
| 2,044,960 | Tryer | June 23, 1936 |
| 2,389,810 | O'Dell et al. | Nov. 27, 1945 |
| 2,421,744 | Daniels et al. | June 10, 1947 |
| 2,642,338 | Pike | Jan. 16, 1953 |
| 2,731,335 | O'Dell | Jan. 17, 1956 |